United States Patent
Linzer

(10) Patent No.: US 9,148,584 B1
(45) Date of Patent: Sep. 29, 2015

(54) AUTOMATIC EXPOSURE WITH DIGITAL GAIN OPTIMIZED FOR NOISE REDUCTION

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 1502 days.

(21) Appl. No.: 11/559,025

(22) Filed: Nov. 13, 2006

(51) Int. Cl.
*H04N 5/243* (2006.01)

(52) U.S. Cl.
CPC ..................... *H04N 5/243* (2013.01)

(58) Field of Classification Search
USPC ....................................... 348/229.1
See application file for complete search history.

(56) References Cited

U.S. PATENT DOCUMENTS

| | | | | |
|---|---|---|---|---|
| 6,522,830 B2 * | 2/2003 | Yamagami | | 386/95 |
| 6,778,216 B1 * | 8/2004 | Lin | | 348/333.11 |
| 7,085,334 B2 * | 8/2006 | Burke et al. | | 375/345 |
| 2003/0184661 A1 * | 10/2003 | Yubata et al. | | 348/229.1 |
| 2003/0223010 A1 * | 12/2003 | Kaplinsky et al. | | 348/362 |
| 2005/0174274 A1 * | 8/2005 | Delanghe et al. | | 341/139 |
| 2006/0187315 A1 * | 8/2006 | Yokonuma | | 348/229.1 |
| 2007/0092244 A1 * | 4/2007 | Pertsel et al. | | 396/153 |

OTHER PUBLICATIONS

"720/60p imaging System-on-Chip—ProCamHD™ 2460/2: 1/3-inch 1.3Mpixel CMOS iSoC," Jul. 27, 2006, pp. 1-8, AltaSens, Inc., Mountain View, CA 94040.

* cited by examiner

*Primary Examiner* — Roberto Velez
*Assistant Examiner* — Yih-Sien Kao
(74) *Attorney, Agent, or Firm* — Christopher P. Maiorana, PC

(57) ABSTRACT

A camera generally including a sensor and an auto-exposure circuit is disclosed. The sensor may be configured to generate a digital signal in response to an optical signal. The auto-exposure circuit may be configured to control a lightness of a picture within the digital signal by (i) adjusting at least one among an aperture, a shutter and an analog gain and (ii) adjusting a digital gain applied to the digital signal, wherein the digital gain adaptively reduces the lightness of the picture.

23 Claims, 3 Drawing Sheets

AUTOMATIC EXPOSURE WITH DIGITAL GAIN OPTIMIZED FOR NOISE REDUCTION

FIELD OF THE INVENTION

The present invention relates to a method and/or architecture for digital photography generally and, more particularly, to an automatic exposure with digital gain optimized for noise reduction.

BACKGROUND OF THE INVENTION

Automatic exposure (AE) is a process by which a still camera or a video camera controls an overall lightness of a picture. For conventional digital cameras, an aperture, a shutter time and a gain are controlled to adjust the lightness. A gain of six decibels (dB) increases a signal voltage by a factor of two.

Many combinations of aperture, shutter time, and gain can achieve a given lightness level. Therefore, besides determining the overall lightness level, conventional AE methods operate with the following considerations: (i) all lenses have a maximum aperture and a minimum aperture, (ii) cameras have a minimum shutter time and a maximum shutter time, (iii) for video cameras, the shutter time cannot exceed a frame time, (iv) electro-optical sensors have a minimum gain and a maximum gain, (v) a wide aperture reduces a depth-of-field, which can be helpful (i.e., focus on the subject and blur the background) or not helpful (i.e., less of the scene can be in focus), (vi) a lens will typically achieve a maximum sharpness and a lowest distortion over a range of aperture values that is smaller than the full range of possible aperture values, (vii) a long shutter time increases motion blurriness, which can be good (i.e., show motion in a still picture, make motion appear smooth in a video sequence) or bad (i.e., the picture is too blurry), (viii) high gain increases noise and is therefore usually avoided, (ix) for low light situations, and with the above described limitations of using shutter time and aperture to increase light, a high gain is sometimes appropriate.

With reasonably good light, conventional AE techniques will try to keep the total picture lightness at a certain level, independent of the amount of available light. For low illumination levels, the conventional AE techniques will permit the picture lightness to be reduced. Furthermore, the maximum gain used at the low illumination levels is reduced to keep the pictures from being too noisy.

SUMMARY OF THE INVENTION

The present invention concerns a camera generally comprising a sensor and an auto-exposure circuit. The sensor may be configured to generate a digital signal in response to an optical signal. The auto-exposure circuit may be configured to control a lightness of a picture within the digital signal by (i) adjusting at least one among an aperture, a shutter and an analog gain and (ii) adjusting a digital gain applied to the digital signal, wherein the digital gain adaptively reduces the lightness of the picture.

The objects, features and advantages of the present invention include providing an automatic exposure with digital gain optimized for noise reduction that may (i) utilize an adjustable digital attenuation of a picture lightness, (ii) integrate white balancing with the digital attenuation and/or (iii) reduce amplification noise compared with conventional techniques.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The following definitions are generally used in describing the present invention.

1. Aperture. A light gathering capacity of a lens. The wider the aperture (e.g., lower "f" number) the more that light is collected. Increasing the aperture by one f-stop generally doubles the amount of light gathered.
2. Shutter time. An amount of time a sensor is exposed to the light. The amount of light incident on the sensor may be proportional to the shutter time.
3. Gain. An amount that an electrical signal, induced by the light incident on the sensor, is amplified. Gain may be broken into two types of gain:
3a. Analogue gain. A gain applied to an analog electrical signal before an analog to digital conversion.
3b. Digital gain. A gain applied after the analog to digital conversion. The digital gain may be achieved by multiplying each digitized pixel value by a number. The digital gain may be applied internal or external to the sensor. Moreover, the digital gain may be applied as a discrete step or as part of a white balance step. The white balance step generally multiplies the color component values (e.g., red values, green values and blue values) of each pixel by different amounts to account for variations in color temperatures. The white balancing may make the color "white" appear to have a similar amount of the red component, the green component and the blue component. Applying the digital gain as part of the white balance step generally means that a red multiplier, a green multiplier and a blue multiplier are all scaled by the same amount to change the overall lightness.

For the same gain amount, the analog gain generally produces a less noisy result than the digital gain. A sensor may provide different analog gain amounts at discrete points that are widely spaced. For example, a ProCamHD™ 2460/2 sensor (ProCamHD™ is a trademark of AltaSens, Inc., Mountain View, Calif.) offers analog gains of 0 decibels (dB), 3 dB, 6 dB, 9 dB, 12 dB, 15 dB, 18 dB, 21 dB and 24 dB. Since the analog gain levels may be available only in discrete steps, the digital gain may be used to achieve gains in-between the analog gain levels.

Figure 1:
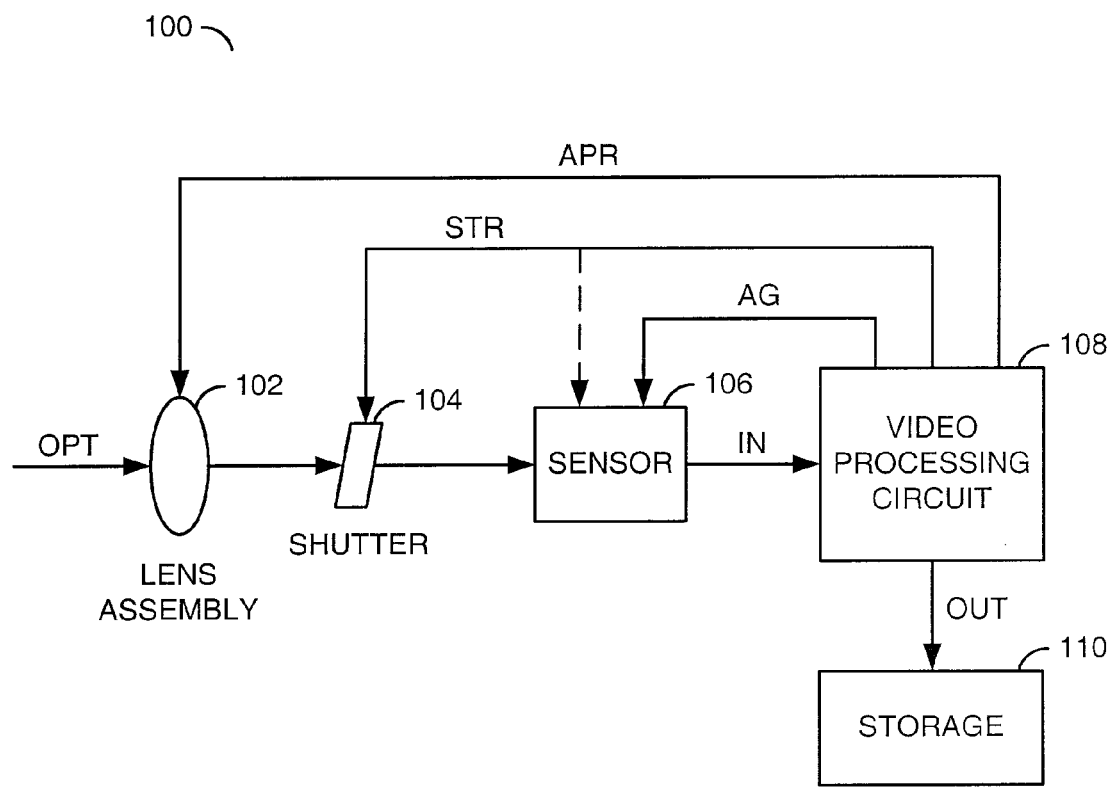
FIG. 1 is a block diagram of a system in accordance with a preferred embodiment of the present invention.

Referring to FIG. 1, a block diagram of a system 100 is shown in accordance with a preferred embodiment of the present invention. The system (or apparatus) 100 may be implemented as a digital still camera and/or a digital video camera. The system 100 generally comprises a lens 102, a shutter 104, a circuit (or module) 106, a circuit (or module) 108 and a circuit (or module) 110.

An input signal (e.g., OPT) may be received by the circuit 106 through the lens assembly 102 and the shutter 104. A signal (e.g., IN) may be generated by the circuit 106 and presented to the circuit 108. The circuit 108 may generate an output signal (e.g., OUT) presented to the circuit 110. A signal (e.g., APR) may be generated by the circuit 108 and presented to the lens assembly 102. The circuit 108 may also generate a signal (e.g., STR) transferred to the shutter 104 or the circuit 106. A signal (e.g., AG) may be generated by the circuit 108 for use by the circuit 106.

The lens assembly 102 may be operational to provide a focusing capability and an aperture capability. The focusing capability generally focuses the optical pictures (or images) in the signal OPT onto a surface of the circuit 106. The aperture capability generally determines an amount of light passing through the lens assembly 102. The aperture capability may be controlled by the signal APR.

The shutter 104 may be implemented as a stand-alone shutter. The shutter 104 may be operational to control an exposure of the circuit 106 to the signal OPT. In some embodiments, the shutter 104 may be absent and the shutter functionality may be implemented by the circuit 106.

The circuit 106 may be implemented as an electro-optical sensor. The circuit 106 is generally operational to covert optical pictures received in the signal OPT into electrical representations of the pictures in the signal IN. An analog gain capability may be included in the circuit 106. The analog gain may be controlled by the signal AG. Furthermore, an analog to digital conversion (ADC) capability may be included in the circuit 106. As such, the signal IN may be a digital signal due to the ADC capability. Optionally, a shutter capability may be included in the circuit 106 and the stand-alone shutter 104 eliminated.

The circuit 108 may be implemented as a video processing circuit. The circuit 108 is generally operational to perform (i) an automatic exposure (AE) control, (ii) pre-compression processing on the pictures received in the signal IN, (iii) compression of the pictures and (iv) presentation of the compressed pictures in the signal OUT. For still pictures, the signal OUT may be compliant with a Joint Picture Experts Group (JPEG) protocol documented in an International Organization for Standardization/International Electrotechnical Commission (ISO/IEC) Standard 10918-1 and/or an International Telecommunication Union-Telecommunications (ITU-T) Recommendation T.81. For moving pictures, the signal OUT may be compliant with an H.264/AVC protocol documented in an ISO/IEC standard 14496-10 and/or an ITU-T Recommendation H.264. Other standards, recommendations and proprietary protocol may be implemented to meet the criteria of a particular application.

The circuit 110 may be implemented as a storage (or memory) circuit. The circuit 110 may be operational to store the compressed pictures received in the signal OUT. The circuit 110 may provide a nonvolatile storage capability, such as a FLASH memory, an optical drive and/or a magnetic hard drive.

The system 100 may operate in one or more AE modes. A first AE mode generally sets the aperture, the shutter time and the analog gain so that with no additional digital gain, the picture lightness may be as bright as intended or darker. An additional digital gain, if any, may be used to make the picture lighter as appropriate. As such, the first AE mode generally uses a nonnegative (e.g., a zero dB or a positive dB) digital gain.

A second AE mode may set the aperture, the shutter time and the analog gain so that with no additional digital gain, the picture may be lighter than intended. Thereafter, a negative digital gain (e.g., a negative dB or a multiplication by a number <1) generally darkens the picture to the intended level. An advantage of the second AE mode over the first AE mode is that the negative digital gain generally reduces noise in the pictures.

The noise reduction may be particularly strong in good lighting situations where the aperture and/or the shutter time are not at maximum limits. As such, opening the aperture and/or increasing the shutter time generally increases the amount of light incident on the circuit 106. A corresponding negative dB digital gain may directly reduce noise in the pictures.

A noise reduction due to a negative dB digital gain may also take place in poor lighting where an increased analog gain may be followed by a negative dB digital gain. For example, a target total gain of 14 dB may be achieved using an analog gain of 18 dB and a digital gain of −4 dB. The above approach generally reduces an overall amplification noise because the added noise of increasing analog gain by 6 dB (e.g., from 12 dB to 18 dB) is generally smaller than the noise reduction achieved by reducing the digital gain by 6 dB (e.g., from 2 dB to −4 dB).

Figure 2:
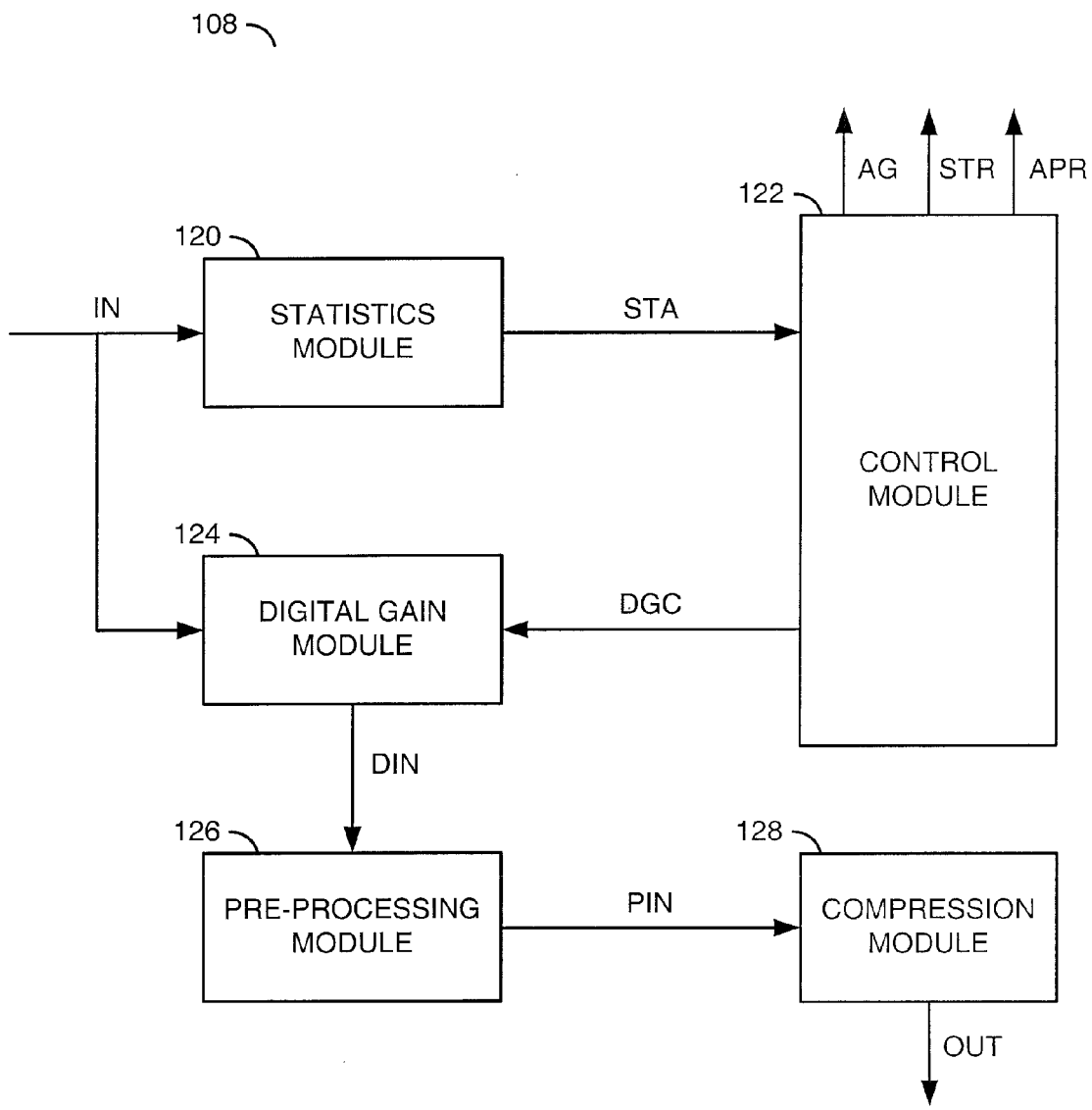
FIG. 2 is a block diagram of an example implementation of a processing circuit.

Referring to FIG. 2, a block diagram of an example implementation of the circuit 108 is shown. The circuit 108 generally comprises a module (or function) 120, a module (or function) 122, a module (or function) 124, a module (or function) 126 and a module (or function) 128.

The signal IN may be received by the module 120 and the module 122. A signal (e.g., STA) may be generated by the module 120 and presented to the module 124. The module 124 may generate the signal AG, the signal STR and the signal APR. A signal (e.g., DGC) may also be generated by the module 122 for use by the module 124. The module 124 may generate and transfer a signal (e.g., DIN) to the module 126. A signal (e.g., PIN) may be generated by the module 126 and presented to the module 128. The module 128 may generate the signal OUT.

The module 120 may be implemented as a statistics gathering module. The module 120 may be operational to collect statistics for some to all of the pixels in the pictures received in the signal IN. The statistics may include, but are not limited to, counting a first number of pixels in each picture having an amplitude greater than a first threshold and counting a second number of pixels in each picture having an amplitude greater than a second threshold. The statistical information may be transferred to the module 122 in the statistics signal STA.

The module 122 may be implemented as a control module. The module 122 is generally operational to control the automatic exposure of the system 100 based on the statistical information and user-controllable settings. The module 122 may repetitively adjust the signal AG, the signal STR and the signal APR to effect the AE function using the analog gain, the shutter time and the aperture. Control of the digital gain aspect of the AE function may be achieved through the digital gain control signal DGC.

The module 124 may be implemented as a digital gain module. The module 124 may also be implemented as a white balance module. The module 124 is generally operational to amplify/attenuate the pixels received in the signal IN to generate corresponding signals in the signal DIN. Amplification may include multiplying the pixels by values greater than one. Attenuation generally includes multiplying the pixels by values less than one. Furthermore, the module 124 may be operational to adjust a color temperature of the pixels by multiplying the respective color components of each pixel by an appropriate color balance value.

The module 126 may be implemented as a pre-compression processing module. The module 126 may be operational to prepare the pictures in the signal DIN for compression. Preparations may include, but are not limited to, scaling, decimating, spatial filtering, temporal filtering, interpolating, interlacing, de-interlacing, image sharpening and/or image smoothing.

The module 128 may be implemented as a compression module. The module 128 is generally operational to compress the pictures in the signal PIN to generate the signal OUT. Compression formats may include H.264/AVC and MPEG-2 for video and JPEG for still pictures. Other compression formats may be implemented to meet the criteria of a particular application.

Figure 3:
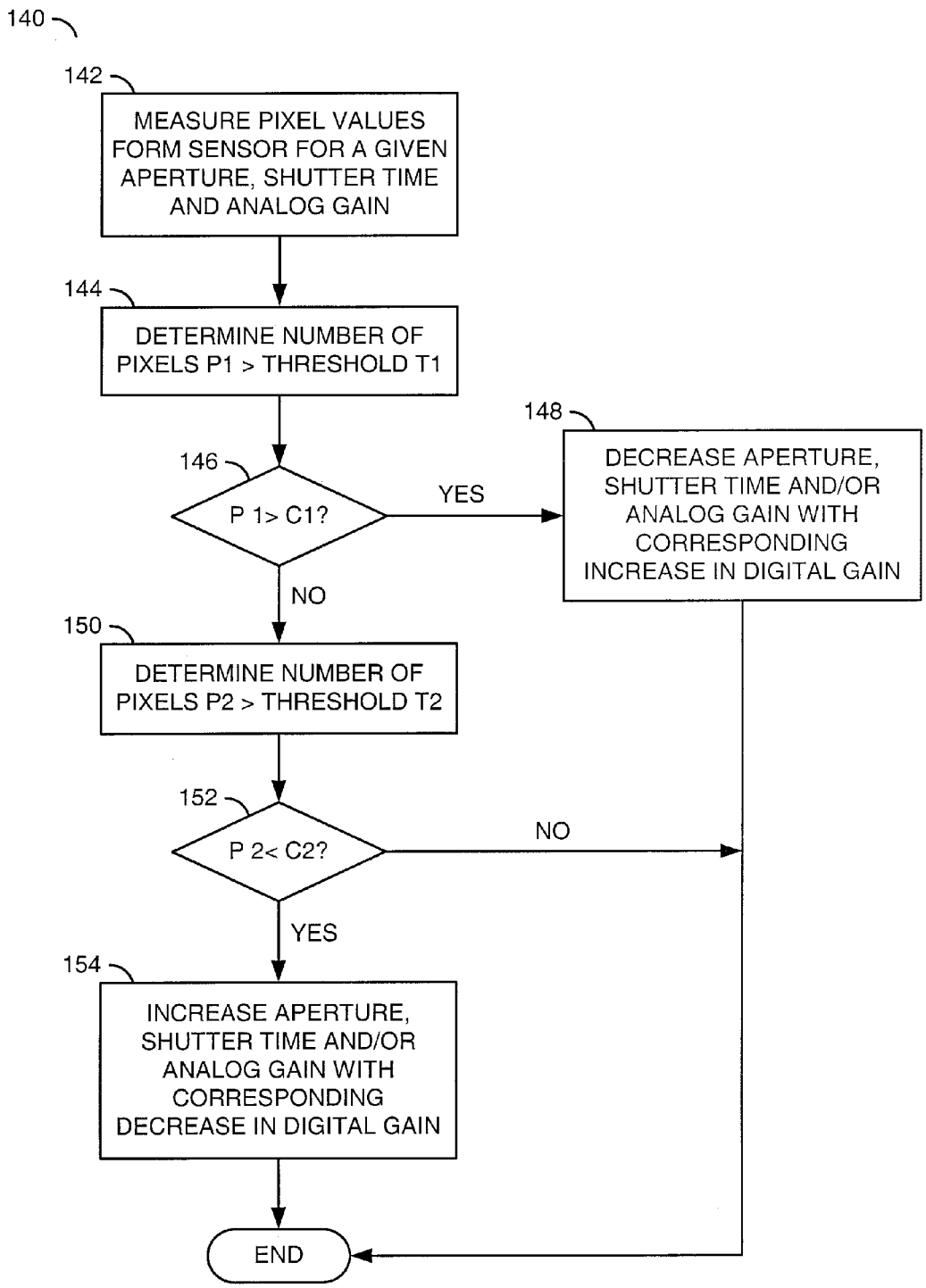
FIG. 3 is a flow diagram of an example method for an automatic exposure control.

Referring to FIG. 3, a flow diagram of an example method 140 for an automatic exposure control is shown. The method 140 generally comprises a step (or block) 142, a step (or block) 144, a step (or block) 146, a step (or block) 148, a step (or block) 150, a step (or block) 152 and a step (or block) 154.

If the aperture, the shutter time and the analog gain are too high, the pixel values may be clipped within the circuit 106. Clipping generally results in visual artifacts that may not be fixed by the negative dB digital gain. For example, a circuit 106 generating 12-bit pixels may represent the value of each pixel as an integer in a range [0, 4095]. After a 12 dB analog gain, two of the pixels may have different values (e.g., 2500 and 3000). Increasing the analog gain to 18 dB generally results in the two pixels being clipped at the maximum value (e.g., 4095). The clipping may not be corrected by the negative dB digital gain. After both pixels have been clipped to the same value, no method exists to determine which pixel should be brighter than the other pixel.

To achieve a final lightness, the aperture, the shutter time, the analog gain and the digital gain may be controlled based on an estimate of clipping that the aperture, the shutter time and the analog gain may cause. The final target lightness may result in a small amount of clipping in each of the pictures. Limiting the amount of clipping may be accomplished, for example, by looking at the statistics derived from the pixel values. The statistics may be used to estimate the amount of clipping that combinations of the aperture, the shutter time and the analog gain generally cause.

In the step 142, the method 140 may measure the pixel values received from the circuit 106 for a given aperture, given shutter time and a given analog gain. In the step 144, a count of a first number of pixels values (e.g., P1) that are greater than a first threshold (e.g., T1) may be performed. The number P1 generally determines if the picture is too bright. A comparison between the number P1 and a first predetermined count value (e.g., C1) may be made in the step 146. If the number P1 of pixels above the threshold T1 is greater than the count C1 (e.g., the YES branch of step 146), the method 140 may (i) increase the digital gain (e.g., less attenuation) and (ii) decrease the aperture, the shutter time and/or the analogue gain (e.g., darken the analog picture) in the step 148. Step 148 generally darkens the picture prior to digitization then restores the picture lightness with the digital gain. If the number P1 is less than or equal to the count C1 (e.g., the NO branch of step 146), the method 140 may continue with the step 150.

In the step 150, a second count of a second number of pixels (e.g., P2) about a second threshold (e.g., T2) may be conducted. The number P2 may give an indication if the picture is too dark. Next, the number P2 may be compared with a second predetermined count value (e.g., C2) in the step 152. In the number P2 is less than the count value C2 (e.g., the YES branch of step 152), the method 140 may (i) decrease the digital gain (e.g., more attenuation) and (ii) increase the aperture, the shutter time and/or the analog gain (e.g., brighten the analog picture) in the step 154. Step 152 generally increases the picture brightness before the analog to digital conversion, then decreases the picture lightness by adjusting the digital gain. If the number P2 is greater than or equal to the count C2, then the present settings for the aperture, the shutter time, the analog gain and the digital gain may remain unchanged.

An example set of values is provided as follows for a sensor having a 12-bit analog to digital converter:

$T1=98\% \times \text{maximum pixel value} = 4013$ $T2=70\% \times \text{maximum pixel value} = 2867$ $C1=1\%$ of the number of pixels (e.g., 80,000 for an 8 megapixel sensor.)

$C2=C1$

Typically, the amount of negative dB digital gain that may be used will depend on the contrast in the scene and/or the target final lightness. For example, if the scene is high contrast (e.g., some parts have direct reflections of sunlight and other parts are in very dark shadows), the correct overall lightness may be achieved by (i) adjusting the aperture, the shutter time and the analog gain and (ii) zeroing the digital gain. Therefore, many of the pixel may be close to or at the maximum ADC value. As such, any increase in the aperture, the shutter time and/or the analog gain may produce significant clipping.

If the scene is low-contrast for a given average lightness throughout, the brightest parts may not be reasonably light. Therefore, the aperture, the shutter time and/or the analog gain may be increased without significant clipping. Thereafter, the correct final lightness level may be achieved with a negative dB digital gain (e.g., an attenuation). If the scene is very dark such that even after all exposure adjustments (e.g., the aperture, the shutter time, the analog gain and the digital gain) have been employed yet the picture lightness remains low, the aperture, the shutter time and/or the analog gain may be increased (even for a high contrast scene) without unacceptable clipping and the digital gain may be adjusted to attenuate the lightness a corresponding amount.

The last case (e.g., picture is dark) may occur when the AE control method (i) permits a low output light level in the picture due to low light in the scene and (ii) attempts to avoid excessive noise. Therefore, the last case generally occurs when the aperture and the shutter times are at the maximum values. In such a case, the present invention generally increases the analog gain and uses a negative dB digital gain. However, a low-contrast scene may occur in good lighting conditions or poor lighting conditions. Therefore, any combination of increased aperture, increased shutter time and/or increased analog gain is possible.

The function performed by the diagrams of FIGS. 1-3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-opti-

The invention claimed is:

1. A camera comprising:
   a sensor configured to generate a digital signal in response to an optical signal; and
   an auto-exposure circuit configured to control a lightness of a picture within said digital signal by (i) adjusting at least one of an aperture and a shutter to achieve a first mode in which said lightness of said picture is greater than an intended level, (ii) adjusting at least one of said aperture and said shutter to achieve a second mode in which said lightness of said picture is less than said intended level and (iii) adjusting a digital gain applied to said digital signal, wherein said digital gain adaptively (a) reduces said lightness of said picture by a negative decibel amount while in said first mode and (b) increases said lightness of said picture by a positive decibel amount while in said second mode.

2. The camera according to claim 1, wherein adjusting said digital gain in said first mode comprises multiplying each of a plurality of pixels in said picture by a gain value smaller than one.

3. The camera according to claim 1, wherein said auto-exposure circuit comprises a white balancing module configured to multiply a plurality of components within each of a plurality of pixels by a plurality of respective balance values to account for variations in a color temperature.

4. The camera according to claim 3, wherein said auto-exposure circuit is further configured to adjust said balance values by multiplying said balance values by said a gain value prior to multiplying said components by said balance values.

5. The camera according to claim 1, wherein said auto-exposure circuit is further configured to adjust said at least one among (i) said aperture, (ii) said shutter and (iii) an analog gain to limit a sensor clipping of said picture.

6. The camera according to claim 1, wherein said auto-exposure circuit comprises a first module configured to make an adjustment to said lightness of said picture in said digital signal in response to a first signal, wherein said adjustment ranges from a predetermined attenuation limit to a predetermined amplification limit.

7. The camera according to claim 6, wherein said auto-exposure circuit further comprises a second module configured to generate said first signal in response to a second signal, said second signal conveying one or more statistics of said picture.

8. The camera according to claim 7, wherein said auto-exposure circuit further comprises a third module configured to generate said statistics in response to a plurality of pixels within said picture.

9. The camera according to claim 1, wherein said auto-exposure circuit comprises a module configured to generate an output signal carrying a compressed representation of said picture.

10. The camera according to claim 9, wherein said output signal is compliant with at least one of (i) an International Organization for Standardization/International Electrotechnical Commission (ISO/IEC) Standard 14496-10, (ii) an International Telecommunication Union-Telecommunications (ITU-T) Recommendation H.264, (iii) an ISO/IEC Standard 10918-1 and (iv) an ITU-T Recommendation T.81.

11. The camera according to claim 1, wherein said auto-exposure circuit is further configured to reduce a noise within said picture by (i) increasing an analog gain by a given amount and (ii) decreasing said digital gain by said given amount.

12. The camera according to claim 1, wherein said auto-exposure circuit is further configured to select between said first mode and said second mode based on both (i) a first number of a plurality of pixels in said picture above a first threshold and (ii) a second number of said pixels between said first threshold and a second threshold.

13. The camera according to claim 1, wherein in said first mode said aperture is adjusted to greater than a narrowest opening.

14. A method for automatic exposure control of a camera, comprising the steps of:
   (A) generating a digital signal in response to an optical signal received by said camera;
   (B) controlling a lightness of a picture within said digital signal by adjusting at least one of an aperture and a shutter to achieve a first mode in which said lightness of said picture is greater than an intended level;
   (C) adjusting at least one of said aperture and said shutter to achieve a second mode in which said lightness of said picture is less than said intended level; and
   (D) adjusting a digital gain applied to said digital signal, wherein said digital gain adaptively (i) reduces said lightness of said picture by a negative decibel amount while in said first mode and (ii) increases said lightness of said picture by a positive decibel amount while in said second mode.

15. The method according to claim 14, wherein adjusting said digital gain in said first mode comprises the sub-step of:
   multiplying each of a plurality of pixels in said picture by a gain value smaller than one.

16. The method according to claim 14, further comprising the step of:
   multiplying a plurality of components within each of a plurality of pixels by a plurality of respective balance values to account for variations in a color temperature.

17. The method according to claim 16, further comprising the step of:
   adjusting said balance values by multiplying said balance values by a gain value prior to multiplying said components by said balance values.

18. The method according to claim 14, wherein step (B) comprises the sub-step of:
   adjusting said at least one among (i) said aperture, (ii) said shutter and (iii) an analog gain to limit a sensor clipping of said picture.

19. The method according to claim 14, further comprising the step of:
   generating a first value by counting a first number of a plurality of pixels in said picture above a first threshold.

20. The method according to claim 19, further comprising the steps of:
   adjusting said at least one among (i) said aperture, (ii) said shutter and (iii) an analog gain to decrease said lightness of said picture by an amount in response to said first value exceeding a first level; and
   adjusting said digital gain to increase said lightness of said picture by approximately said amount.

21. The method according to claim 19, further comprising the step of:

generating a second value by counting a second number of said pixels above a second threshold.

22. The method according to claim 21, further comprising the steps of:
adjusting said at least one among (i) said aperture, (ii) said shutter and (iii) an analog gain to increase said lightness of said picture by an amount in response to a second level exceeding said second value; and
adjusting said digital gain to decrease said lightness of said picture by approximately said amount.

23. A camera comprising:
means for generating a digital signal in response to an optical signal received by said camera;
means for controlling a lightness of a picture within said digital signal by adjusting at least one of an aperture and a shutter to achieve a first mode in which said lightness of said picture is greater than an intended level;
means for adjusting at least one of said aperture and said shutter to achieve a second mode in which said lightness of said picture is less than said intended level; and
means for automatically adjusting a digital gain applied to said digital signal, wherein said digital gain adaptively (i) reduces said lightness of said picture by a negative decibel amount while in said first mode and (ii) increases said lightness of said picture by a positive decibel amount while in said second mode.

* * * * *